United States Patent [19]
Shimizu et al.

[11] Patent Number: 5,946,206
[45] Date of Patent: Aug. 31, 1999

[54] PLURAL PARALLEL RESONANT SWITCHING POWER SUPPLIES

[75] Inventors: Katsuhiko Shimizu; Masaharu Hatta, both of Sakura, Japan

[73] Assignee: TDK Corporation, Tokyo, Japan

[21] Appl. No.: 09/021,818

[22] Filed: Feb. 11, 1998

[30] Foreign Application Priority Data

Feb. 17, 1997 [JP] Japan ................................ 9-032467

[51] Int. Cl.⁶ .................................................. H02M 3/335
[52] U.S. Cl. ............................ 363/65; 363/16; 363/71
[58] Field of Search .......................... 363/15, 16, 65, 363/71, 95, 97, 131

[56] References Cited

U.S. PATENT DOCUMENTS

| | | | |
|---|---|---|---|
| 3,596,165 | 7/1971 | Andrews | 363/16 |
| 4,535,399 | 8/1985 | Szepesi | 363/97 |
| 4,648,020 | 3/1987 | Vinciarelli | 363/71 |
| 4,692,851 | 9/1987 | Attwood | 363/16 |
| 4,805,081 | 2/1989 | Chambers et al. | 363/71 |
| 5,060,130 | 10/1991 | Steigerwald | 363/65 |
| 5,490,052 | 2/1996 | Yoshida et al. | 363/131 |
| 5,610,804 | 3/1997 | Shimizu | 363/21 |
| 5,729,121 | 3/1998 | Coenders et al. | 363/71 |
| 5,761,055 | 6/1998 | Oxada et al. | 363/16 |
| 5,875,103 | 2/1999 | Bhagwat et al. | 363/65 |
| 5,880,944 | 3/1999 | Hickman | 363/65 |

*Primary Examiner*—Jeffrey Sterrett
*Attorney, Agent, or Firm*—Oblon, Spivak, McClelland, Maier & Neustadt, P.C.

[57] ABSTRACT

A plurality of converter circuits A and B are provided. The converter circuits A and B have circuit structures that are identical to each other. In the converter circuit A, a resonant capacitor 31, a resonant inductor 32 and a primary winding 51 of a transformer 5 are connected in series, with the two ends of the serial circuit thus achieved connected between the connecting point of switching elements 11 and 12 and one end of a source 10. The output ends of output rectifier smoothing circuits 7 and 8 are connected commonly. Resonant circuits 3 and 4 of the converter circuits A and B are connected with each other.

11 Claims, 8 Drawing Sheets

PLURAL PARALLEL RESONANT SWITCHING POWER SUPPLIES

BACKGROUND OF THE INVENTION

1. Field of the Invention

The present invention relates to a resonant switching power supply employing a parallel operation system in which a plurality of resonant converter circuits are connected in parallel.

2. Discussion of Background

A great deal of interest is focused on resonant switching power supplies having the potential to achieve high efficiency and low noise. A resonant switching power supply performs switching on a DC source through a switching circuit, causes the switching output to resonate at a resonant circuit and takes out the resonant output via the winding of a transformer to convert it to DC for output.

A resonant switching power supply may adopt a parallel operation system in which a plurality of resonant DC—DC converter circuits are connected in parallel in order to increase the power to be converted and to perform redundant operations.

As a means for achieving parallel operation by employing a plurality of resonant switching power supplies in the prior art, a plurality of switching power supplies are connected in parallel, the individual output currents are detected and control is performed independently for each of them to ensure that the output currents from the individual switching power supplies are almost equal to one another.

However, this type of parallel operation system, which requires a number of control circuits equal to the number of the switching power supplies, tends to increase the cost and leads to an increase in the size of the device.

In addition, the output stabilization control for a resonant switching power supply is achieved by controlling the switching frequency and changing the impedances of the resonant circuits. However, since the circuit constant values of a resonant capacitor and a resonant inductor in a resonant circuit are normally different among different resonant switching power supplies, the switching frequencies also vary among the individual resonant switching power supplies. Because of this, when equalization of the individual share of current for the individual switching power supplies is attempted, a frequency beat noise occurs, posing a problem in that the control becomes unstable.

If one control circuit is shared by a plurality of resonant switching power supplies, synchronized control can be performed at one frequency and, as a result, generation of frequency beat noise and unstable control can be avoided. However, in this case, zero volt switching (hereafter referred to as ZVS) becomes difficult. Namely, in a plurality of resonant switching power supplies that are operated in parallel, if the impedances of the resonant circuits are different from one another due to different constant values of the circuit elements and the like, the energy that has been accumulated in the resonant circuit may have already been discharged in a converter circuit with a high resonance frequency at its resonant circuit during dead time in which the switching elements are turned off, resulting in almost no current, which makes ZVS impossible.

U.S. Pat. No. 4,648,020 discloses a technology through which the constant values in the resonant circuits are matched in the individual switching power supplies to achieve balanced load sharing among the individual resonant switching power supplies. However, this technology requires matched selection of the circuit elements that are to constitute the resonant circuits, which causes a reduction in productivity and an imbalance in load sharing resulting from the different tolerance ranges. Similar problems occur due to changes that the circuit elements undergo over time and the like.

SUMMARY OF THE INVENTION

It is an object of the present invention to provide a resonant switching power supply employing a parallel operation system with which a reduction in product cost and a reduction in product size are possible.

It is a further object of the present invention to provide a resonant switching power supply employing a parallel operation system with which generation of frequency beat noise and unstable control can be avoided.

It is a still further object of the present invention to provide a resonant switching power supply employing a parallel operation system with which ZVS is possible.

It is a still further object of the present invention to provide a resonant switching power supply employing a parallel operation system that does not require matched selection of the circuit elements that are to constitute its resonant circuits to avoid a reduction in productivity and an imbalance in the load sharing, the cause of which originates in the circuit elements.

In order to achieve the objects described above, the switching power supply according to the present invention includes a plurality of converter circuits. Each of the plurality of converter circuits includes two switching elements, a transformer, a resonant circuit and an output rectifier smoothing circuit. The two switching elements, which are connected in series, are driven alternately with the two ends of the serial circuit thus achieved, led to a DC source. The transformer includes at least a primary winding and a secondary winding.

The resonant circuit is provided with a resonant capacitor and a resonant inductor. The resonant capacitor, the resonant inductor and the primary winding of the transformer are connected in series, with the two ends of the serial circuit connected between the connecting point of the two switching elements and one end of the serial circuit constituted of the two switching elements. The output rectifier smoothing circuit is connected to the secondary winding of the transformer, with its output end commonly connected at the plurality of converter circuits. The resonant circuits of the plurality of converter circuits are connected to one another.

In the switching power supply according to the present invention, each of the plurality of converter circuits switches an input DC source by alternately operating the two switching elements that are connected in series, and supplies the switching output to the resonant circuit and the primary winding of the transformer.

Since the two ends of the serial circuit constituted by connecting in series the resonant capacitor and the resonant inductor constituting the resonant circuit and the primary winding of the transformer are connected between the connecting point of the two switching elements and one end of the serial circuit constituted of the two switching elements, a pseudo sine wave current that corresponds to the resonance frequency at the resonant circuit flows to the resonant circuit and the primary winding of the transformer through the alternating operation of the two switching elements. An induced voltage is generated at the secondary winding that is linked with the primary winding at this time. This induced voltage is converted to DC at the output rectifier smoothing circuit connected to the secondary winding of the transformer and is then output.

Since the output end of the output rectifier smoothing circuit is commonly connected at the plurality of converter circuits, a resonant switching power supply that employs a parallel operation system whereby the outputs from the plurality of converter circuits are commonly supplied to the load is achieved.

In the resonant switching power supply employing a parallel operation system as described above, the resonant circuits of the plurality of converter circuits are connected to one another. Consequently, the impedances of the resonant circuits viewed from the switching element side are almost equal to each other in the plurality of converter circuits. Thus, generation of frequency beat noise and unstable control can be avoided by operating the plurality of converter circuits in synchronization at the same frequency.

This means that the plurality of converter circuits can be controlled with only one control circuit. As a result, a resonant switching power supply employing a parallel operation system with which lower cost and miniaturization become possible is achieved.

Furthermore, since the impedances at the resonant circuits viewed from the switching element side are almost equal to one another in the plurality of converter circuits, a specific resonance current can be supplied, thereby making it possible to perform ZVS.

Moreover, since the impedances at the resonant circuits are matched by connecting the resonant circuits to one another, even if the circuit constant values of the circuit elements constituting the resonant circuits are different among the plurality of converter circuits, it is not necessary to implement matched selection of the circuit elements, thereby preventing a reduction in productivity and an imbalance in load sharing, the cause of which originates in the circuit elements.

BRIEF DESCRIPTION OF THE DRAWINGS

More specific features and advantages of the present invention are explained in further detail in reference to the drawings, wherein.

DETAILED DESCRIPTION OF THE PREFERRED EMBODIMENTS

Figure 1:
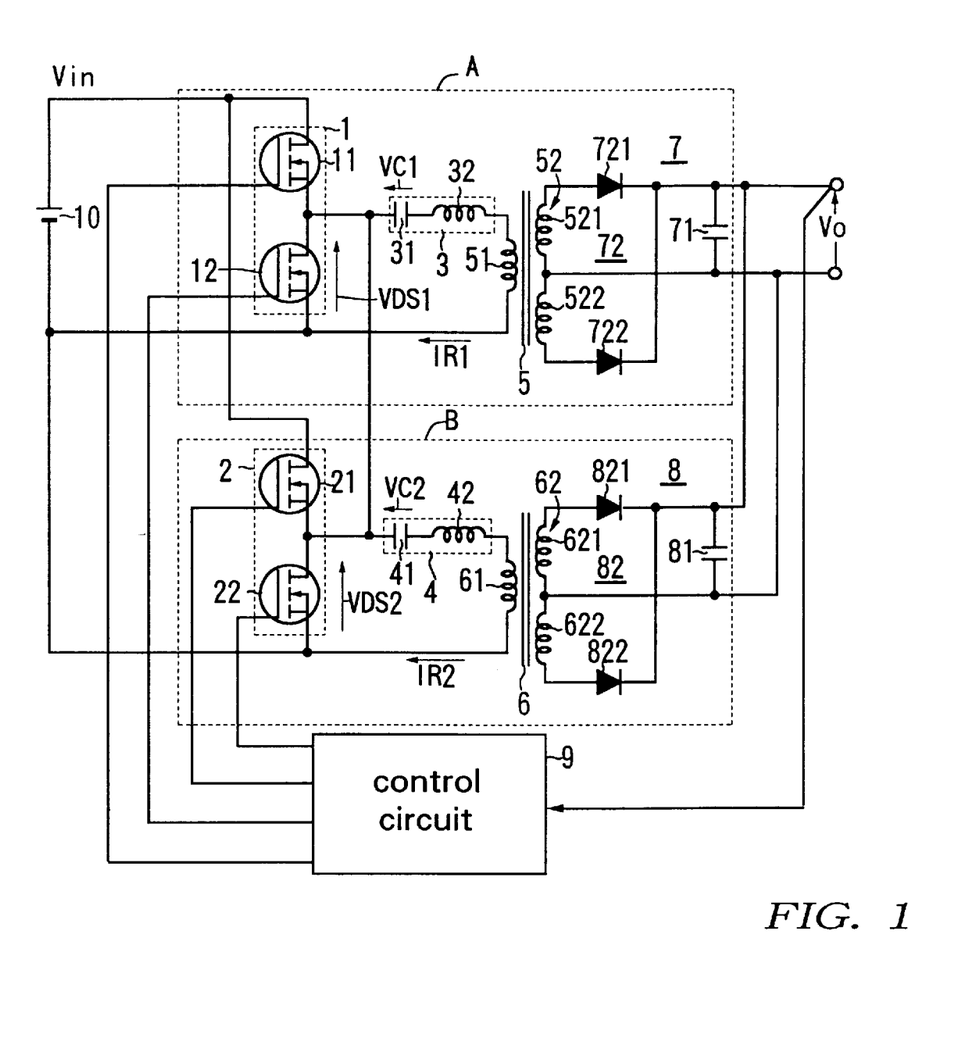
FIG. 1 illustrates an electric circuit diagram of the resonant switching power supply employing a parallel operation system according to the present invention.

Referring to FIG. 1, the switching power supply according to the present invention is provided with a plurality of converter circuits A and B. Reference number 9 indicates a control circuit and reference number 10 indicates a DC source. While there are two converter circuits A and B provided in the embodiment, there may be a greater number of converter circuits. The converter circuits A and B have almost identical circuit structures.

The converter circuit A is provided with a switching circuit 1, a resonant circuit 3, a transformer 5 and an output rectifier smoothing circuit 7.

The switching circuit 1 switches an input DC source Vin. The switching circuit 1 is provided with a first switching element 11 and a second switching element 12. The first switching element 11 and the second switching element 12 may be each constituted of an FET or the like and their main circuits are connected with each other in series with both ends thereof connected to the DC source device 10. The DC source device 10 is normally structured as a rectifier smoothing circuit that converts an AC source to DC. The DC source device 10 may be provided as a portion of a switching power supply device or it may be provided as an external element.

The transformer 5 includes at least a primary winding 51 and a secondary winding 52. The embodiment presents the structure of the secondary winding which is suitable for a converter circuit in which the output rectifier smoothing circuit 7 is constituted as a full wave rectifier circuit, with the secondary winding 52 having two windings, i.e., a first winding 521 and a second winding 522 and the first winding 521 and the second winding 522 connected with each other at one end.

The resonant circuit 3 is provided with a resonant capacitor 31 and a resonant inductor 32. The resonant capacitor 31 and the resonant inductor 32 are connected within a circuit loop that includes the switching circuit 1 and the primary winding 51 of the transformer 5. In the embodiment, one end of the resonant capacitor 31 is connected to the connecting point of the switching elements 11 and 12 with one end of the resonant inductor 32 connected to the other end of resonant capacitor 31. The other end of the resonant inductor 32 is connected to one end of the primary winding 51 of the transformer 5. As a result, the resonant circuit 3 constitutes a serial resonant circuit constituted of the resonant capacitor 31 and the resonant inductor 32.

The output rectifier smoothing circuit 7 is connected to the secondary winding 52 of the transformer 5 and converts the induced voltage generated at the secondary winding 52 to DC for output. While the output rectifier smoothing circuit 7 in the figure is a capacitor input type provided with an output smoothing capacitor 71, it may be a choke input type provided with an output choke coil. A rectifier circuit 72 is provided with a first diode 721 and a second diode 722. The anode of the first diode 721 is connected to the other end of the first winding 521, whereas the anode of the second diode 722 is connected to the other end of the second winding. The cathodes of the first diode 721 and the second diode 722 are connected to each other and then connected to one end of the output smoothing capacitor 71.

Now, the converter circuit B is provided with a switching circuit 2, a resonant circuit 4, a transformer 6 and an output rectifier smoothing circuit 8.

The switching circuit 2 switches an input DC source Vin. The switching circuit 2 is provided with a first switching element 21 and a second switching element 22. The first switching element 21 and the second switching element 22 may be each constituted of an FET or the like and their main circuits are connected with each other in series with both ends thereof connected to the DC source device 10.

The transformer 6 includes at least a primary winding 61 and a secondary winding 62. The embodiment presents a structure of the secondary winding which is suitable for a converter circuit in which the output rectifier smoothing circuit 8 is constituted as a full wave rectifier circuit, with the secondary winding 62 having two windings, i.e., a first winding 621 and a second winding 622 and the first winding 621 and the second winding 622 connected with each other at one end.

The resonant circuit 4 is provided with a resonant capacitor 41 and a resonant inductor 42. The resonant capacitor 41 and the resonant inductor 42 are connected within a circuit loop that includes the switching circuit 2 and the primary winding 61 of the transformer 6. In the embodiment, one end of the resonant capacitor 41 is connected to the connecting point of the switching elements 21 and 22, with one end of the resonant inductor 42 connected to the other end of the resonant capacitor 41. The other end of the resonant inductor 42 is connected to one end of the primary winding 61 of the transformer 6.

The output rectifier smoothing circuit 8 is connected to the secondary winding 62 of the transformer 6 and converts the induced voltage generated at the secondary winding 62 to DC for output. While the output rectifier smoothing circuit 8 in the figure is a capacitor input type provided with the output smoothing capacitor 81, it may be a choke input type provided with an output choke coil. A rectifier circuit 82 is provided with a first diode 821 and a second diode 822. The anode of the first diode 821 is connected to the other end of the first winding 621, whereas the anode of the second diode 822 is connected to the other end of the second winding. The cathodes of the first diode 821 and the second diode 822 are connected to each other and then connected to one end of the output smoothing capacitor 81.

The output ends of the output rectifier smoothing circuit 7 provided in the converter circuit A and the output rectifier smoothing circuit 8 provided in the converter circuit B are connected commonly to supply DC output voltage Vo to the load (not shown).

Furthermore, a crucial feature of the present invention is that the resonant circuits 3 and 4 of the converter circuits A and B are connected to each other. In the embodiment, the resonant circuit 3 of the converter circuit A and the resonant circuit 4 of the converter circuit B are connected to each other at the connecting point of the switching elements 11 and 12 and the connecting point of the switching elements 21 and 22. As has been explained, one end of the resonant capacitor 31 is connected to the connecting point of the switching elements 11 and 12 and one end of the resonant capacitor 41 is connected to the connecting point of the switching elements 21 and 22.

The control circuit 9 controls the switching circuits 1 and 2 so that the output voltage Vo output by the output rectifier smoothing circuits 7 and 8 is constant. In addition, the control circuit 9 provides the switching elements (11, 12) and (21, 22) with a control signal to cause the switching elements (11, 12) and (21, 22) to operate in a frequency range which is higher than the resonance frequencies determined by the capacitance and inductance of each of the resonant circuits 3 and 4 and the exciting inductance of each of the transformers 5 and 6. The control circuit 9 may be constituted of, for instance, a voltage control oscillator (VCO) whose frequency is controlled by a voltage.

In the switching power supply described above, the converter circuit A performs switching on the DC source Vin that has been input by causing the switching elements 11 and 12 that are connected in series to operate alternately to supply its switching output to the resonant circuit 3 and the primary winding 51 of the transformer 5.

Since the two ends of the serial circuit constituted by connecting in series the resonant capacitor 31 and the resonant inductor 32 constituting the resonant circuit 3 and the primary winding 51 of the transformer 5 are connected between the connecting point of the switching elements 11 and 12 and one end of the serial circuit constituted of the switching elements 11 and 12, a pseudo sine wave current that corresponds to the resonance frequency of the resonant circuit 3 is supplied to the resonant circuit 3 and the primary winding 51 of the transformer 5 through the alternating operation of the switching elements 11 and 12. An induced voltage is generated at the secondary winding 52 that is linked with the primary winding 51 at this point. This induced voltage is converted to DC by the output rectifier smoothing circuit 7 which is connected to the secondary winding 52 of the transformer 5 and is then output.

A similar circuit operation is performed at the converter circuit B. Namely, switching is performed on the DC source Vin that has been input by causing the switching elements 21 and 22 that are connected in series to operate alternately to supply its switching output to the resonant circuit 4 and the primary winding 61 of the transformer 6.

Since the two ends of the serial circuit constituted by connecting in series the resonant capacitor 41 and the resonant inductor 42 constituting the resonant circuit 4 and the primary winding 61 of the transformer 6 are connected between the connecting point of the switching elements 21 and 22 and one end of the serial circuit constituted of the switching elements 21 and 22, a pseudo sine wave current that corresponds to the resonance frequency of the resonant circuit 4 is supplied to the resonant circuit 4 and the primary winding 61 of the transformer 6 through the alternating operation of the switching elements 21 and 22. An induced voltage is generated at the secondary winding 62 that is linked with the primary winding 61 at this point. This induced voltage is converted to DC at the output rectifier smoothing circuit 8 which is connected to the secondary winding 62 of the transformer 6 and the DC output voltage Vo is supplied to the load (not shown).

Through this structure, in which the output ends of the output rectifier smoothing circuits 7 and 8 are commonly connected at the converter circuits A and B, a resonant switching power supply employing a parallel operation system that commonly supplies the output from the converter circuits A and B to the load is achieved.

In the resonant switching power supply employing the parallel operation system described above, the resonant circuits 3 and 4 in the converter circuits A and B are connected to each other. As a result, the impedances at the resonant circuits 3 and 4 viewed from the side of the switching elements (11, 12) and (21, 22) are almost equal to each other at the converter circuits A and B. Because of this, by operating the converter circuits A and B in synchronization with each other at the same frequency, generation of frequency beat noise and unstable control can be avoided.

This means that the converter circuits A and B can be controlled by employing only one control circuit 9. Consequently, a resonant switching power supply employing a parallel operation system which is capable of realizing lower cost and miniaturization can be achieved.

Furthermore, since the impedances of the resonant circuits 3 and 4 viewed from the side of the switching elements (11, 12) and (21, 22) are almost equal to each other at the converter circuits A and B, the timing with which the converter A operates and the timing with which the converter B operates match. Thus, at both the converter circuits A and B, the switching elements (11, 12) and (21, 22) can be turned off while resonance currents IR1 and IR2 are sufficiently high to achieve ZVS.

Figure 2:
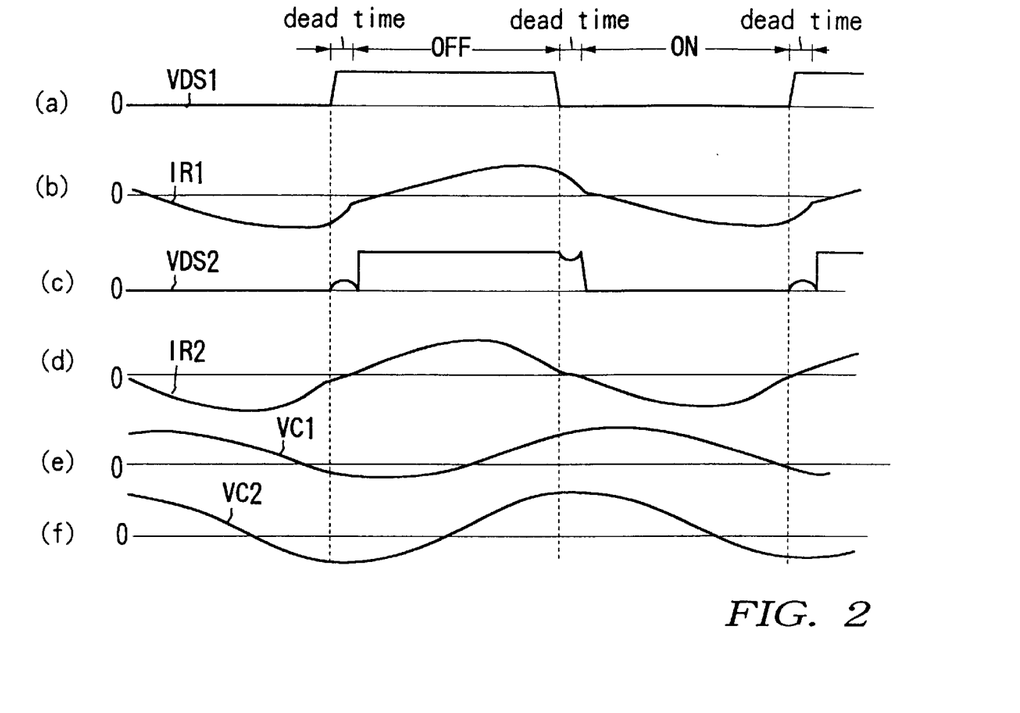
FIG. 2 illustrates a waveform diagram of waveforms achieved in a resonant switching power supply employing a parallel operation system in the prior art which is constituted by removing the line connecting the resonant circuits from the circuit shown in FIG. 1.
Figure 3:
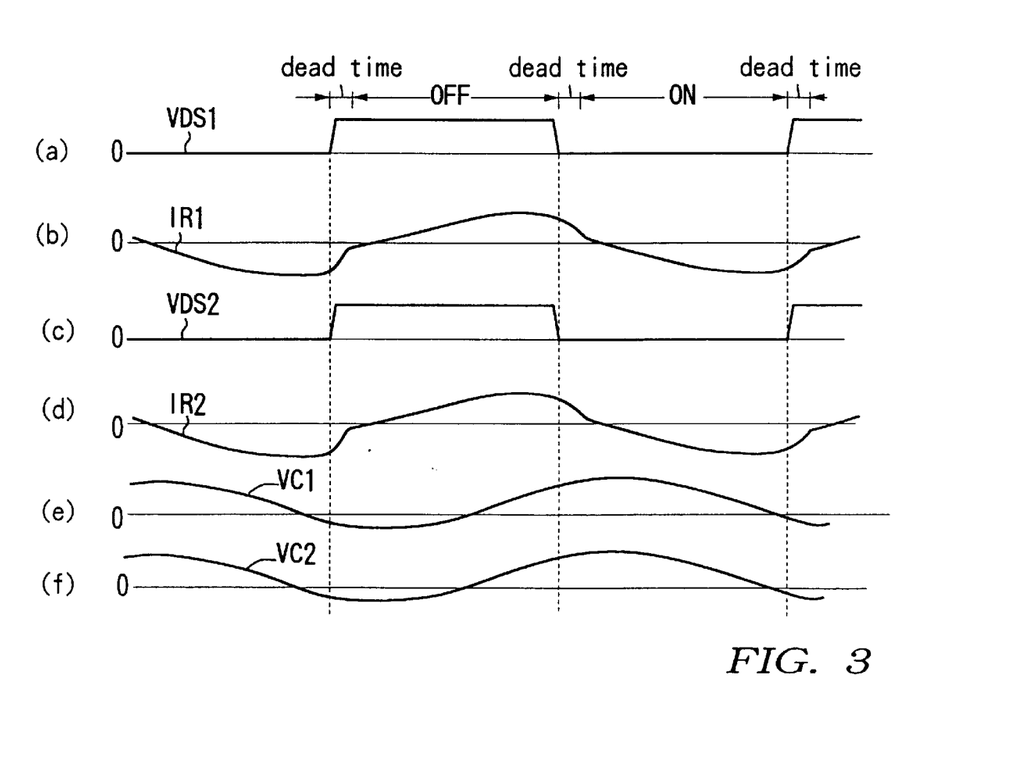
FIG. 3 illustrates a waveform diagram of waveforms achieved in the resonant switching power supply employing a parallel operation system according to the present invention shown in FIG.

FIG. 2 is a waveform diagram presenting the waveforms that are achieved in a circuit constituted by removing the line connecting the resonant circuits 3 and 4 in FIG. 1, and represents the equivalent of the operating characteristics of a switching power supply in the prior art. FIG. 3 is a waveform diagram of the waveforms achieved by the switching power supply according to the present invention shown in FIG. 1.

In FIG. 2, VDS1 represents the voltage waveform between the drain and the source of the switching element 12, VC1 represents the terminal voltage waveform at the resonant capacitor 31 and IR1 represents the waveform of the resonance current running to the resonant circuit 3.

In FIG. 3, VDS2 represents the voltage waveform between the drain and the source of the switching element 22, VC2 represents the terminal voltage waveform at the resonant capacitor 41 and IR2 represents the waveform of the resonance current running to the resonant circuit 4.

In the case of the switching power supply in the prior art shown in FIG. 2, since the impedances at the resonant circuits 3 and 4 are different from each other due to differences in the constant values of the circuit elements in the converter circuits A and B, the energy that has been accumulated in the resonant circuit 4 will have been discharged during dead time when the switching element 21 is off in the converter circuit B, whose resonant circuit has a high resonance frequency, setting the current IR2 to almost 0 and, as a result, ZVS cannot be achieved.

In contrast, in the case of the switching power supply according to the present invention shown in FIG. 1, since the impedances at the resonant circuits 3 and 4 viewed from the side of the switching elements (11, 12) and (21, 22) are almost equal to each other at the converter circuits A and B, the timing with which the converter circuit A operates and the timing with which the converter circuit B operates match. Because of this, the switching elements (11, 12) and (21, 22) can be turned off at both the converter circuits A and B while the resonance currents IR1 and IR2 are sufficient for performing ZVS.

Furthermore, even if the circuit constant values of the resonant capacitor 31 and the resonant inductor 32 constituting the resonant circuit 3 differ from those of the resonant capacitor 41 and the resonant inductor 42 constituting the resonant circuit 4 between the converter circuit A and B, the impedances at the resonant circuits are made almost equal to each other by connecting the resonant circuits 3 and 4 with each other. As a result, it is not necessary to make matched selection of the resonant capacitors 31 and 41 and the resonant inductors 32 and 42, making it possible to prevent a reduction in productivity and imbalance in load sharing, the cause of which originates in the circuit elements.

Various modes may be adopted for connecting the resonant circuits 3 and 4. Some examples are explained in reference to FIGS. 4 to 8. In the figures, the same reference numbers are assigned to components that are identical to those in FIG. 1 and their explanation is omitted.

Figure 4:
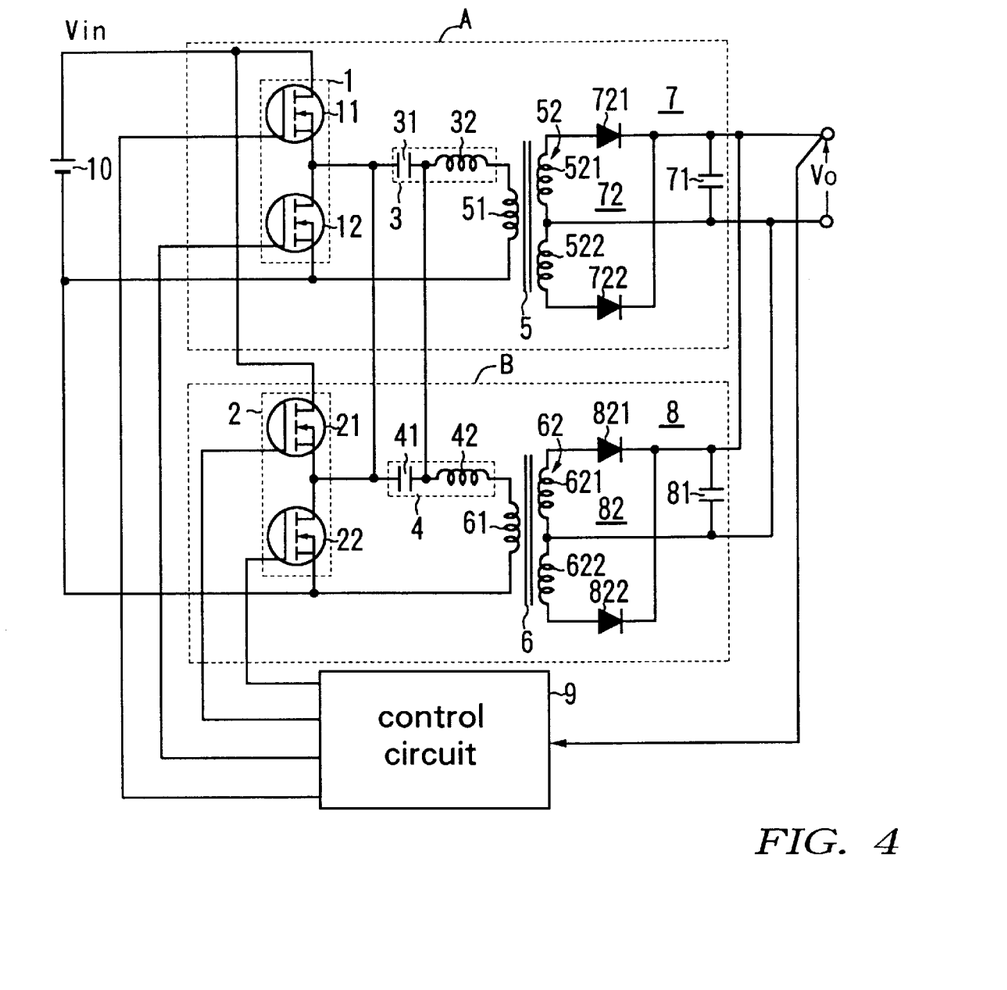
FIG. 4 illustrates an electric circuit diagram representing another embodiment of the resonant switching power supply employing a parallel operation system according to the present invention.

First, in the embodiment shown in FIG. 4, in the structure in which the resonant capacitors 31 and 41 are connected at one end to the connecting points of the switching elements (11, 12) and (21, 22) respectively, the other ends of the resonant capacitors 31 and 41 are connected to each other. With this embodiment, the resonant capacitors 31 and 41 are connected in parallel with each other to form a capacitance circuit. Also, a circuit which is constituted of a serial connection of the inductor 32 and the primary winding 51 and a circuit which is constituted of a serial connection of the inductor 42 and the primary winding 62, are connected in parallel with each other to form an inductance circuit. The capacitance circuit and the inductance circuit are connected in serial with each other.

Figure 5:
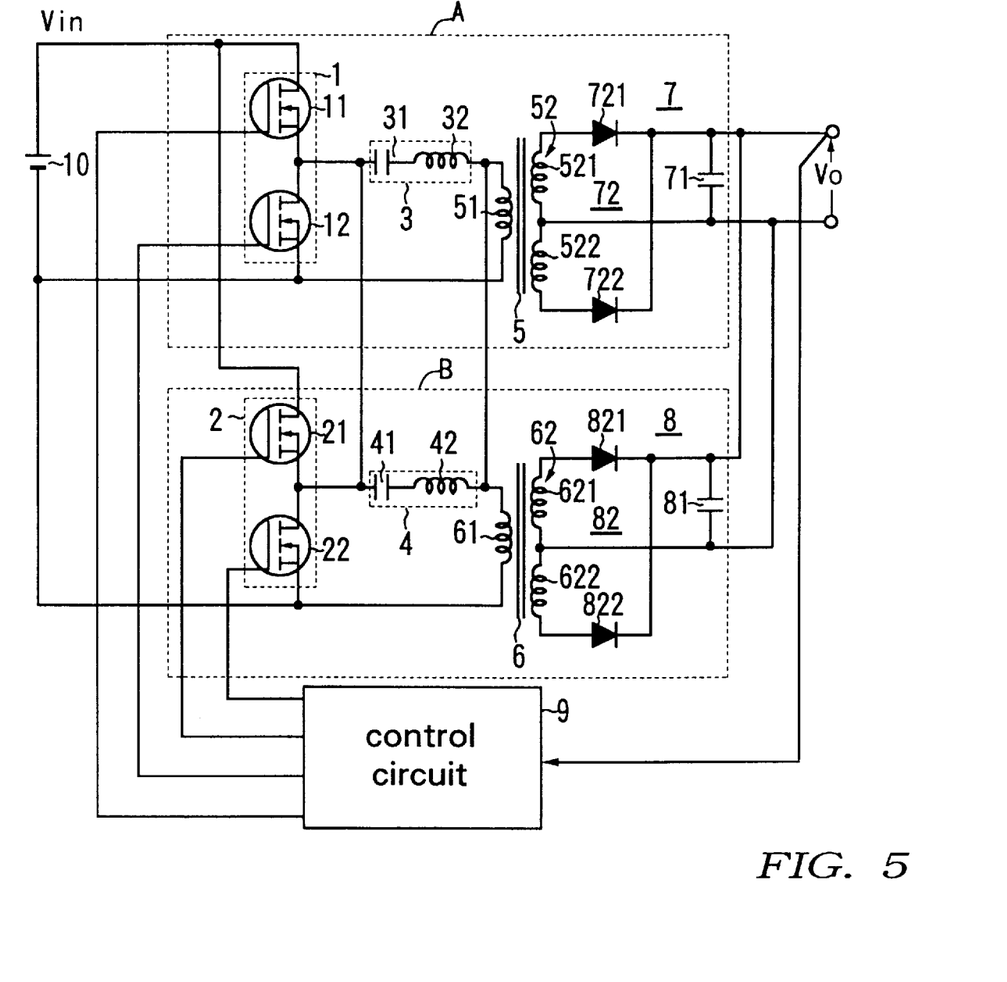
FIG. 5 illustrates an electric circuit diagram representing yet another embodiment of the resonant switching power supply employing a parallel operation system according to the present invention.

Next, in the embodiment shown in FIG. 5, the resonant capacitors 31 and 41 are connected at one end to the connecting points of the switching elements (11, 12) and (21, 22) respectively and the resonant inductors 32 and 42 are connected at one end to the other ends of the resonant capacitors 31 and 41 respectively, with the other ends of the resonant inductors 32 and 42 connected with each other. With this structure, a serial circuit constituted of the resonant capacitor 31 and the resonant inductor 32, and a serial circuit constituted of the resonant capacitor 41 and the resonant inductor 42 are connected in parallel each other to form a LC circuit. The primary windings 51 and 61 are connected in parallel with each other to form a inductance circuit. The LC circuit and the inductance circuit are connected in serial with each other.

Figure 6:
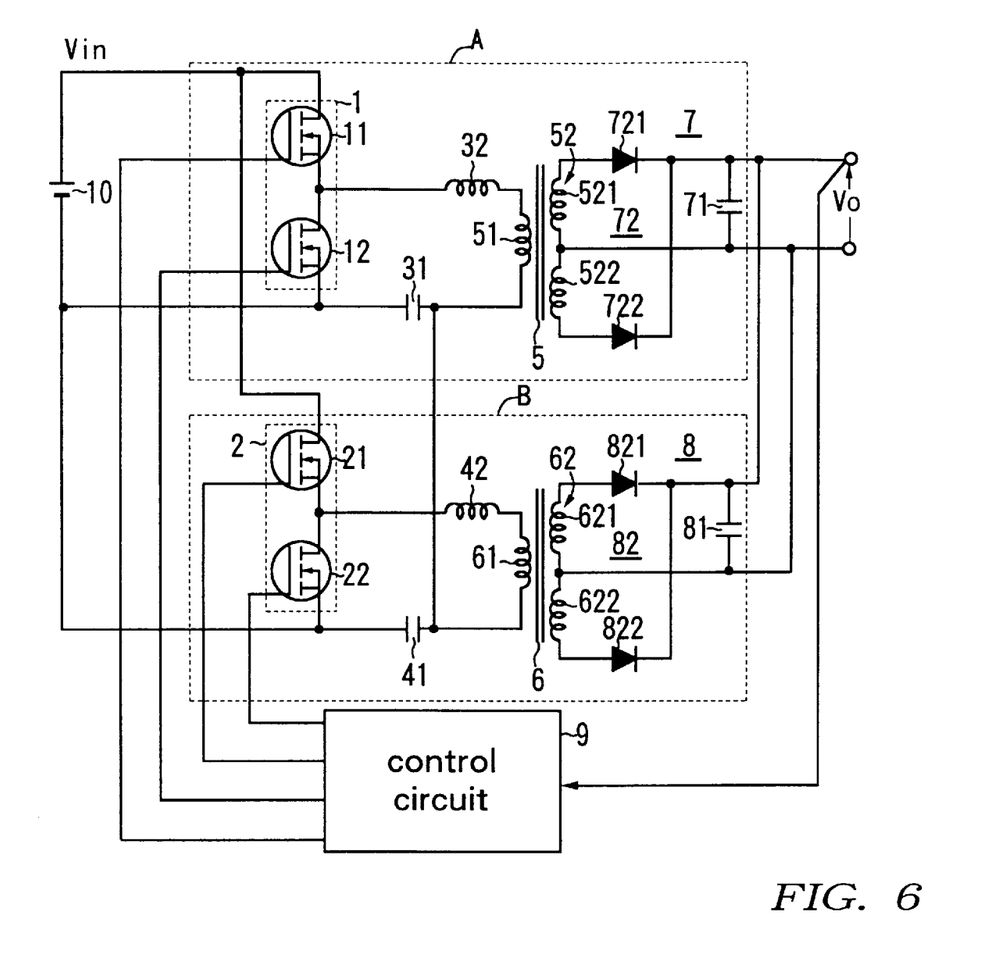
FIG. 6 illustrates an electric circuit diagram representing yet another embodiment of the resonant switching power supply employing a parallel operation system according to the present invention.

In the embodiment shown in FIG. 6, one end of the resonant capacitor 31 is connected to one end of the serial circuit constituted of the switching elements 11 and 12 and one end of the resonant capacitor 41 is connected to one end of the serial circuit constituted of the switching elements 21 and 22. The other ends of the resonant capacitors 31 and 41 are connected with each other. In this embodiment, the capacitors 31 and 41 are connected in parallel with each other to form a capacitance circuit. The capacitance circuit is connected with a serial circuit of the inductor 32 and the primary winding 51 or a serial circuit of the inductor 42 and the primary winding 61.

Figure 7:
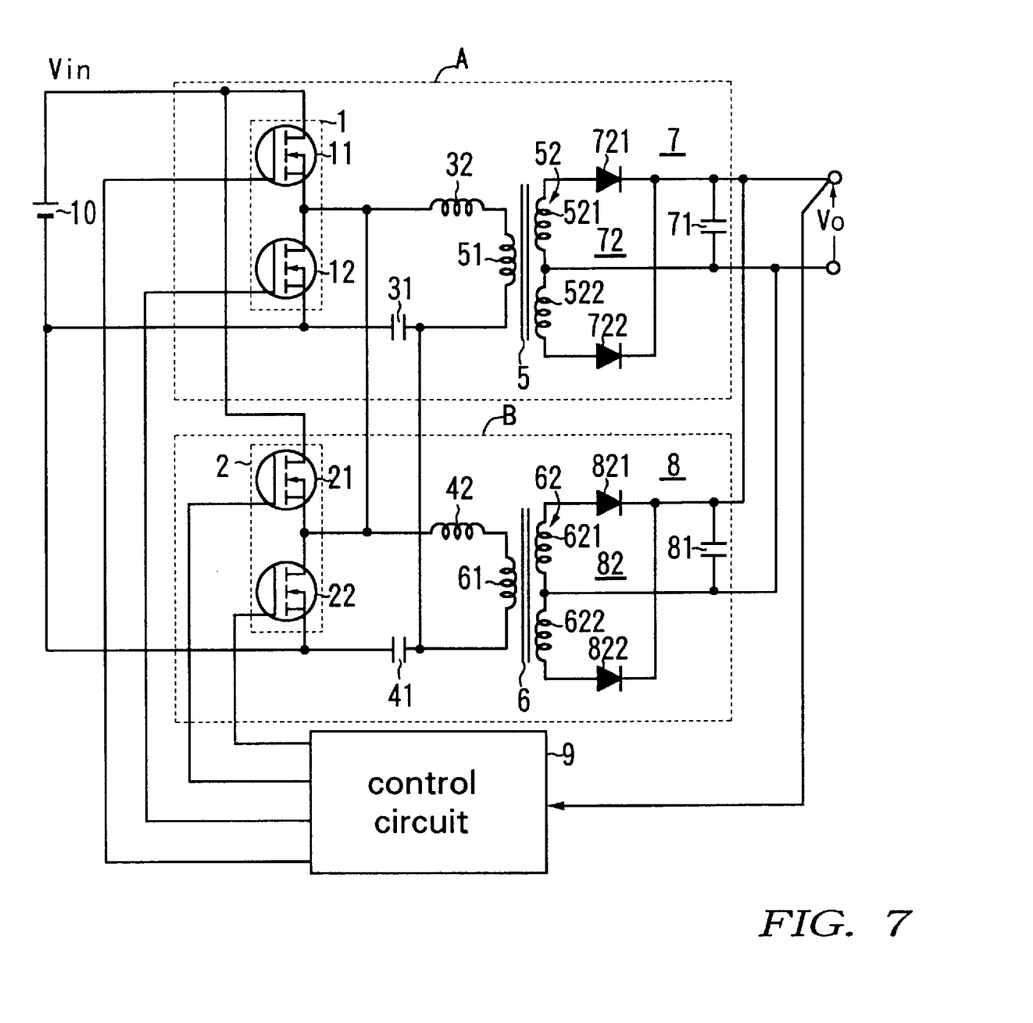
FIG. 7 illustrates an electric circuit diagram representing yet another embodiment of the resonant switching power supply employing a parallel operation system according to the present invention.

In the embodiment shown in FIG. 7, the connecting points of the switching elements 11 and 12 and the connecting point of the switching elements 21 and 22 are connected with each other. At the respective connecting points, one end of the resonant inductor 32 and one end of the resonant inductor 42 are connected. In addition, one end of the resonant capacitor 31 is connected to one end of the serial circuit constituted of the switching elements 11 and 12 and one end of the resonant capacitor 41 is connected to one end of the serial circuit constituted of the switching elements 21 and 22. The other ends of the resonant capacitors 31 and 41 are connected with each other. In this embodiment, the capacitors 31 and 32 are connected in parallel with each other to form a capacitance circuit. A circuit which is constituted of a serial connection of the inductor 32 and the primary winding 51 and a circuit which is constituted of a serial connection of the inductor 42 and the primary winding 61 are connected in parallel with each other to form an inductance circuit. The capacitance circuit and the inductance circuit are connected in serial with each other.

Figure 8:
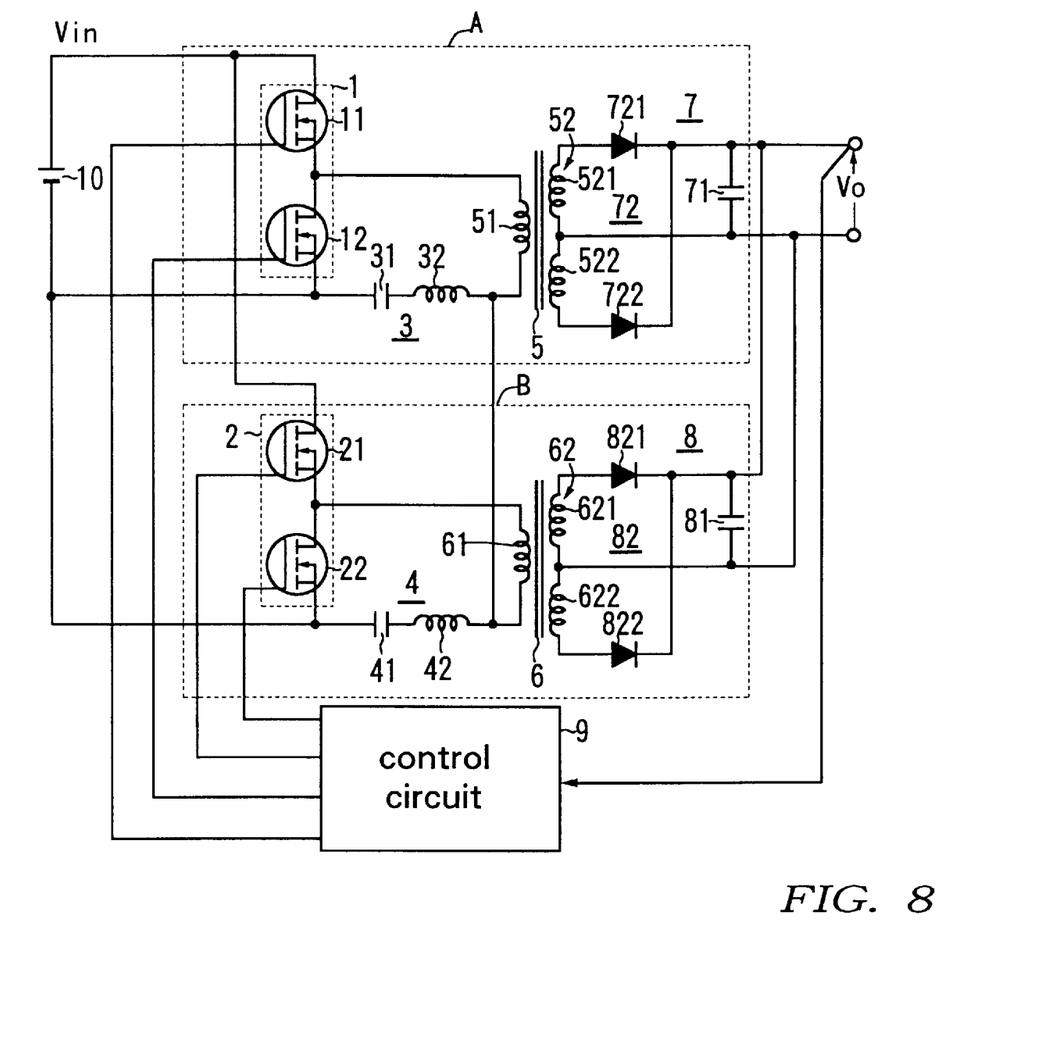
FIG. 8 illustrates an electric circuit diagram representing yet another embodiment of the resonant switching power supply employing a parallel operation system according to the present invention.

In the embodiment shown in FIG. 8, one end of the resonant capacitor 31 is connected to one end of the serial circuit constituted of the switching element 11 and 12, with one end of the resonant inductor 32 connected to the other end of the resonant capacitor 31. One end of the resonant capacitor 41 is connected to one end of the serial circuit constituted of the switching element 21 and 22, with one end of the resonant inductor 42 connected to the other end of the resonant capacitor 41. The other ends of the resonant inductors 32 and 42 are connected to each other. In this embodiment, a serial circuit constituted of the resonant capacitor 31 and the resonant inductor 32, and a serial circuit constituted of the resonant capacitor 41 and the resonant inductor 42 are connected in parallel to each other to form an LC circuit. The primary windings 51 and 61 are each connected in serial with the LC circuit.

In any of these embodiments, since the impedances at the resonant circuits 3 and 4 viewed from the side of the switching elements (11, 12) and (21, 22) are almost equal to each other at the converter circuits A and B, by operating the converter circuits A and B in synchronization with each other at the same frequency, generation of frequency beat noise and unstable control can be avoided.

This means that the converter circuits A and B can be controlled by employing only one control circuit 9. Consequently, a resonant switching power supply employing a parallel operation system which is capable of realizing lower cost and miniaturization can be achieved.

Furthermore, since the impedances of the resonant circuits 3 and 4 viewed from the side of the switching elements (11, 12) and (21, 22) are almost equal to each other at the converter circuits A and B, the timing with which the converter A operates and the timing with which the converter B operates match. Thus, at both the converter circuits A and B, the switching elements (11, 12) and (21, 22) can be turned off while resonance currents IR1 and IR2 are sufficiently high to achieve ZVS.

As has been explained, according to the present invention, the converter circuits A and B are driven in synchronization with each other at the same frequency. In the embodiments presented in FIGS. 1 to 8, this is realized by providing one control circuit 9, thereby achieving advantages in that a reduction in the cost of the switching power supply and miniaturization are realized and in that generation of frequency beat noise and unstable control are prevented.

Figure 9:
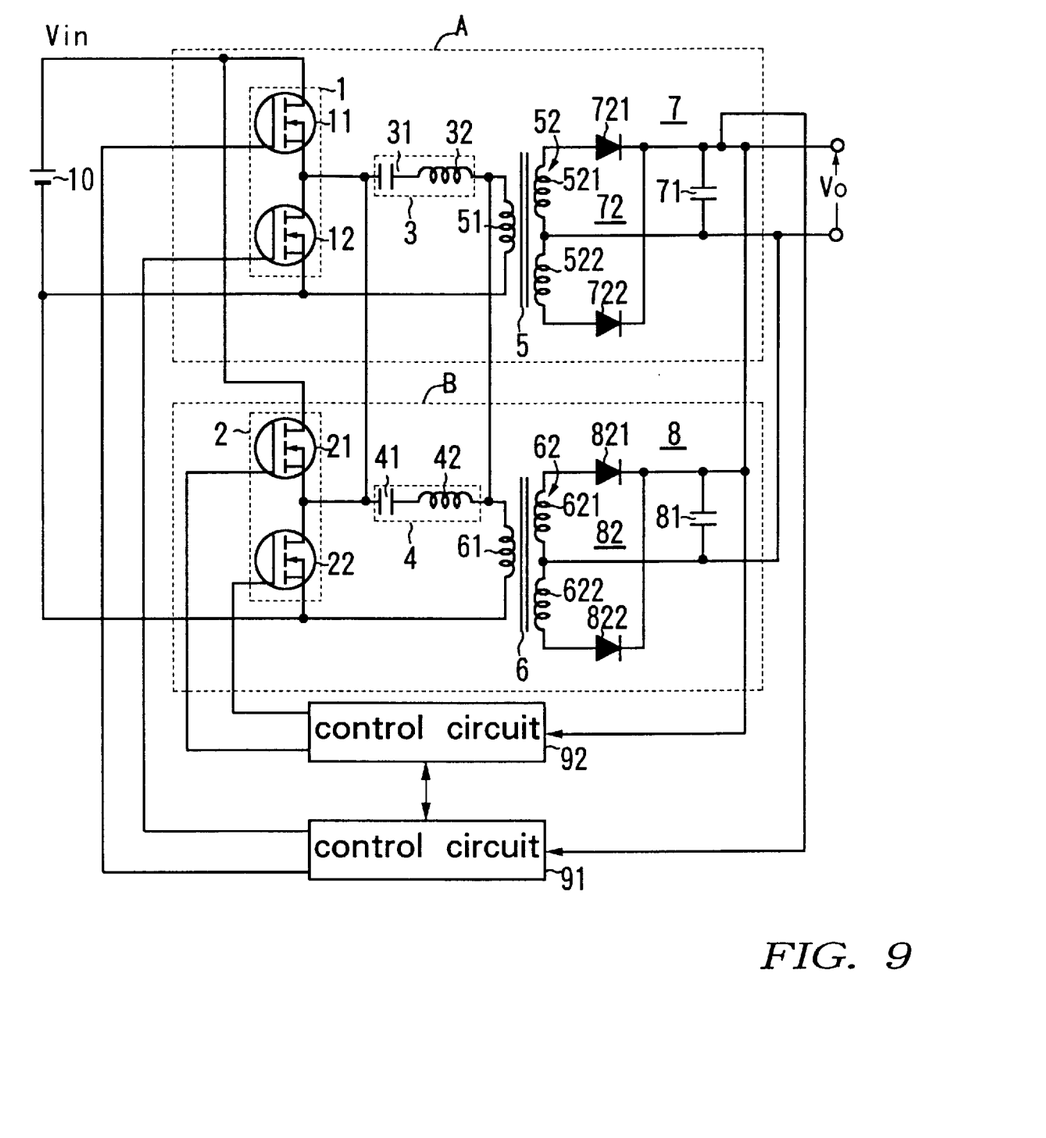
FIG. 9 illustrates an electric circuit diagram representing yet another embodiment of the resonant switching power supply employing a parallel operation system according to the present invention.

FIG. 9 is an electric circuit diagram representing another embodiment. In this embodiment, a control circuit 91 for the converter circuit A and a control circuit 92 for the converter circuit B are provided. The control circuits 92 and 92 drive the switching elements (11, 12) and (21, 22) in synchronization with each other at the same frequency while monitoring each other's operations. The circuit structure constituted of the resonant circuits 3 and 4 is the same as the circuit structure shown in FIG. 5.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

What is claimed is:

1. A switching power supply comprising a plurality of converter circuits each having two switching elements, a transformer, a resonant circuit and an output rectifier smoothing circuit; wherein:

said two switching elements in each converter circuit are connected in series to form a serial circuit of which two ends are led to a DC source to be driven alternately;

said transformer in each converter circuit includes at least a primary winding and a secondary winding;

said resonant circuit in each converter circuit has a resonant capacitor and a resonant inductor;

said resonant capacitor, resonant inductor and primary winding in each converter circuit are connected in series to form a serial circuit of which two ends are connected between a connecting point of said two switching elements and one end of said serial circuit which is constituted of said two switching elements;

said output rectifier smoothing circuit in each converter circuit is connected to said secondary winding of said transformer;

output ends of each of said output rectifier smoothing circuits included in each of said plurality of converter circuits are connected to each other; and each of said resonant circuits included in said plurality of converter circuits are connected with each other.

2. A switching power supply according to claim 1, wherein:

each of said resonant circuits of said plurality of converter circuits are connected with each other at said connecting point of said two switching elements.

3. A switching power supply according to claim 2, wherein:

one end of said resonant capacitor at each of said resonant circuits of said plurality of converter circuits is connected to said connecting point of said two switching elements.

4. A switching power supply according to claim 3, wherein:

other ends of said resonant capacitors are connected with each other.

5. A switching power supply according to claim 3, wherein:

one end of said resonant inductor is connected to another end of said resonant capacitor.

6. A switching power supply according to claim 5, wherein:

other ends of said resonant inductors are connected with each other.

7. A switching power supply according to claim 1, wherein:

one end of said resonant capacitor is connected to another end of said serial circuit constituted of said two switching elements with other ends of said resonant capacitors connected with each other.

8. A switching power supply according to claim 1, wherein:

said connecting point of said two switching elements are connected with each other;

one end of said resonant inductor is connected at said connecting point; and one end of said resonant capacitor is connected to one end of said serial circuit constituted of said two switching elements with other ends of said resonant capacitors connected with each other.

9. A switching power supply according to claim 1, wherein:

one end of said resonant capacitor is connected to one end of said serial circuit constituted of said two switching elements, with one end of said resonant inductor connected to another end of said resonant capacitor; and other ends of said resonant inductors are connected with each other.

10. A switching power supply according to claim 1, wherein:

said plurality of converter circuits are driven in synchronization at one frequency.

11. A switching power supply according to claim 10, further comprising:

a control circuit that is shared by said plurality of converter circuits.

* * * * *